June 26, 1962 L. A. WILLIAMS 3,041,265
ELECTRODE FOR ELECTROLYTIC HOLE SINKING
Filed Jan. 13, 1961 7 Sheets-Sheet 1
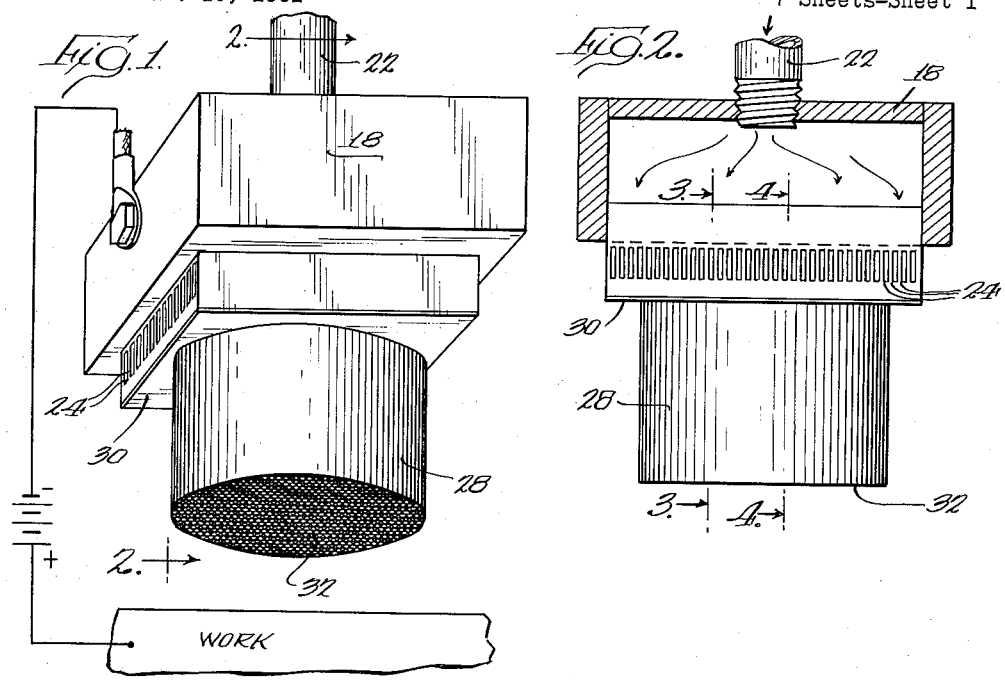
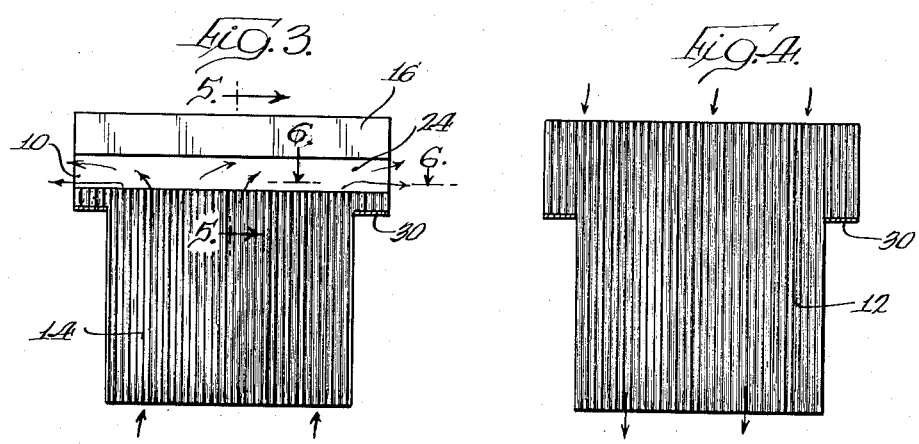
INVENTOR.
Lynn A. Williams
BY
Wupper, Gradolph & Love
Attys

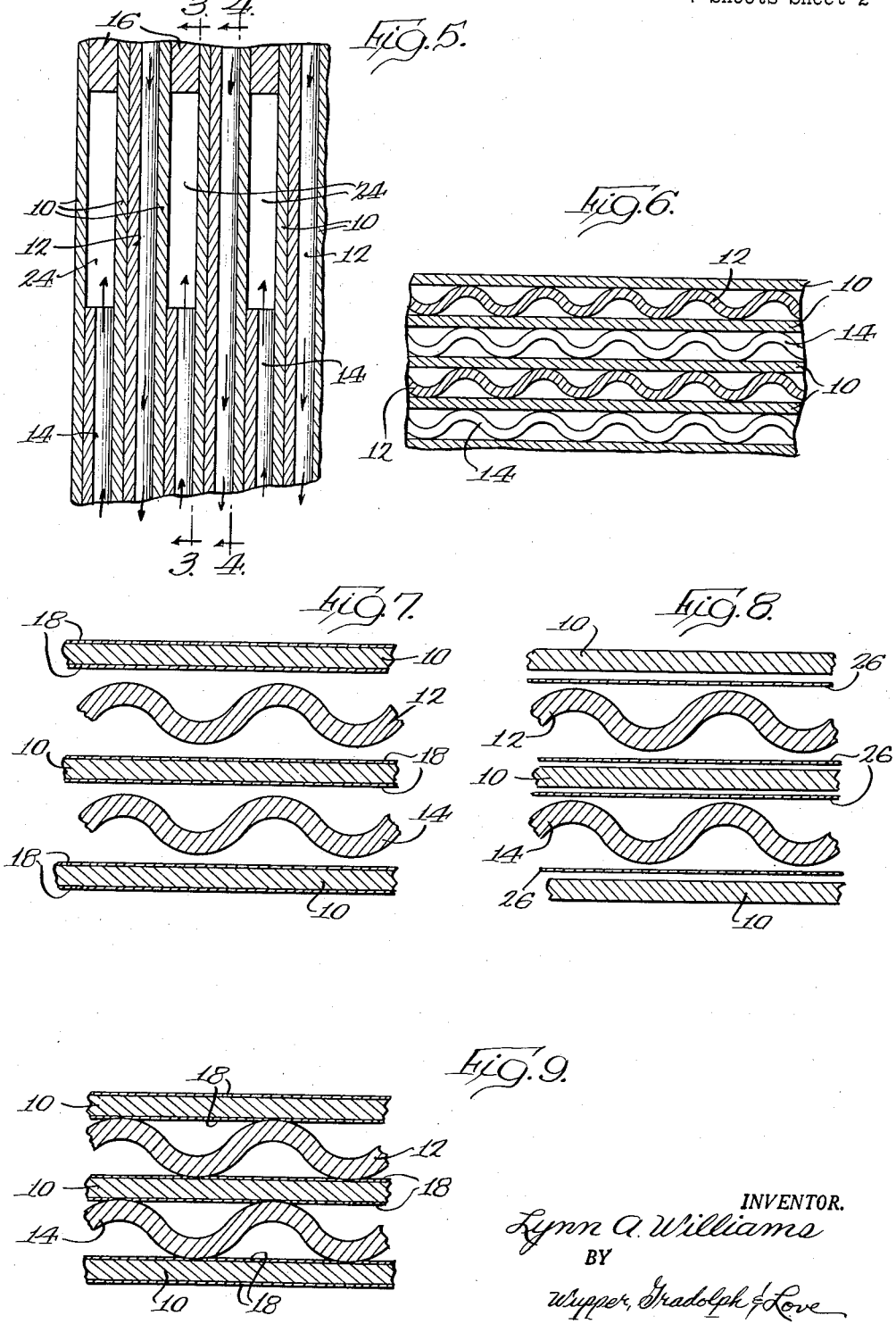

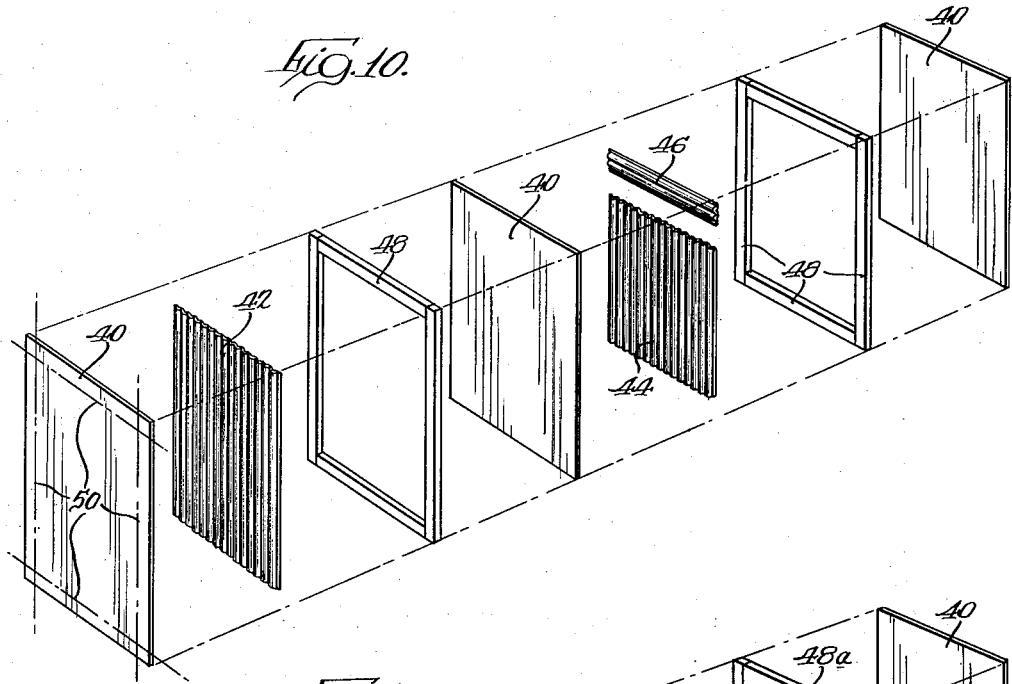
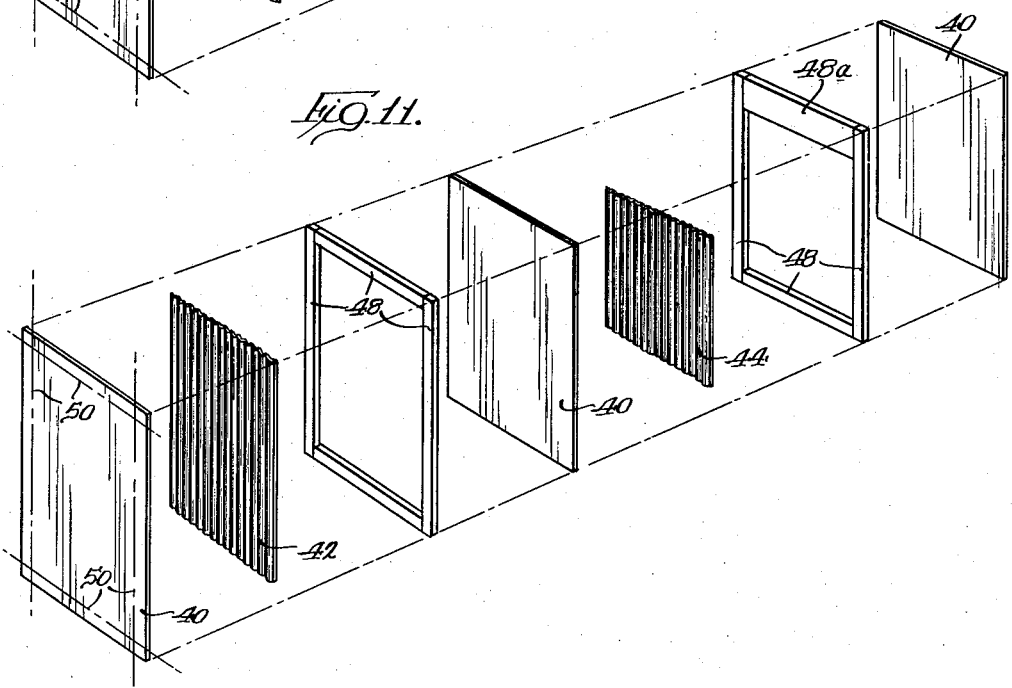

June 26, 1962 L. A. WILLIAMS 3,041,265
ELECTRODE FOR ELECTROLYTIC HOLE SINKING
Filed Jan. 13, 1961 7 Sheets-Sheet 4
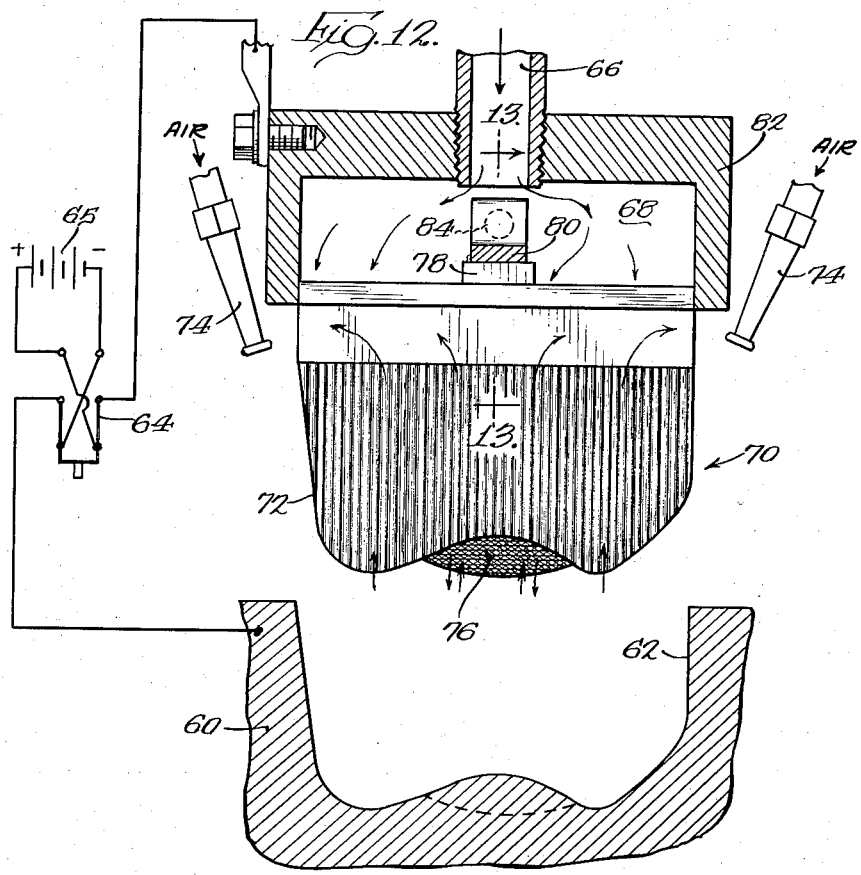
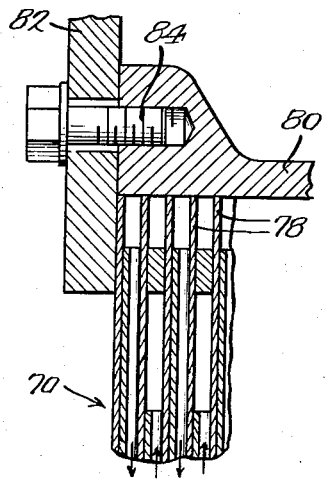
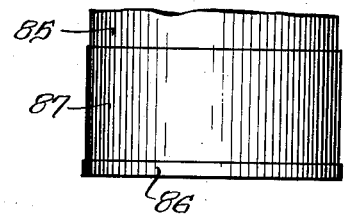
INVENTOR.
Lynn A. Williams
BY
Wupper, Gradolph & Love
Attys.

June 26, 1962 L. A. WILLIAMS 3,041,265
ELECTRODE FOR ELECTROLYTIC HOLE SINKING
Filed Jan. 13, 1961 7 Sheets-Sheet 5
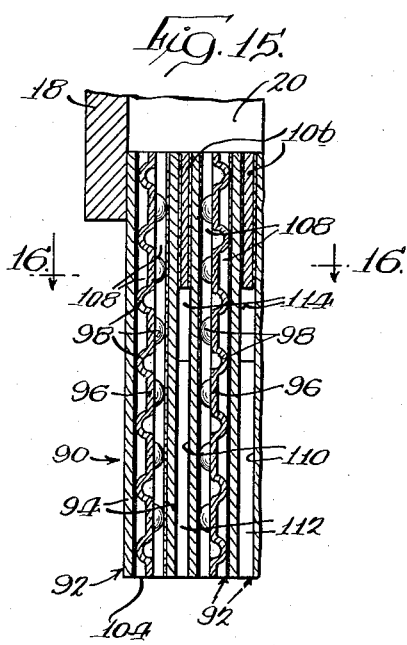
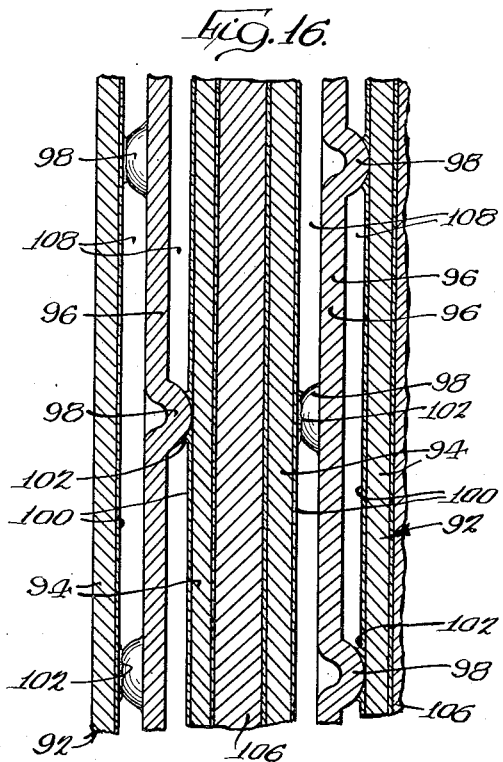
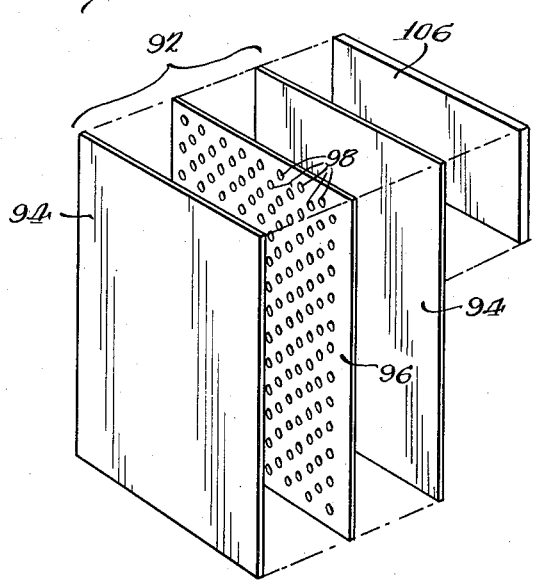
INVENTOR.
Lynn A. Williams
BY
Wupper, Gradolph & Love
Atty's

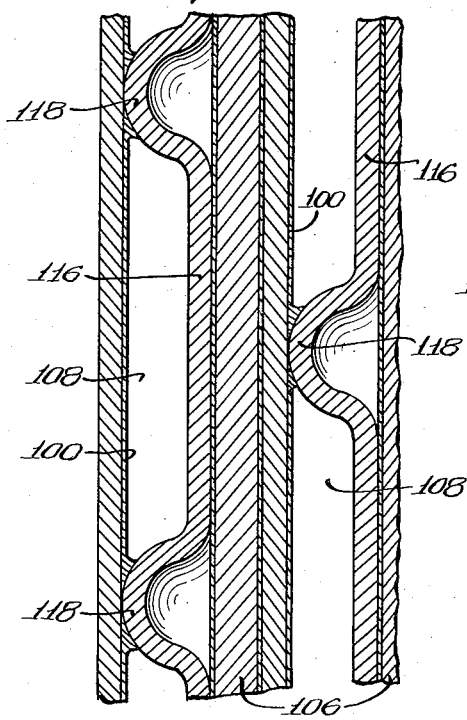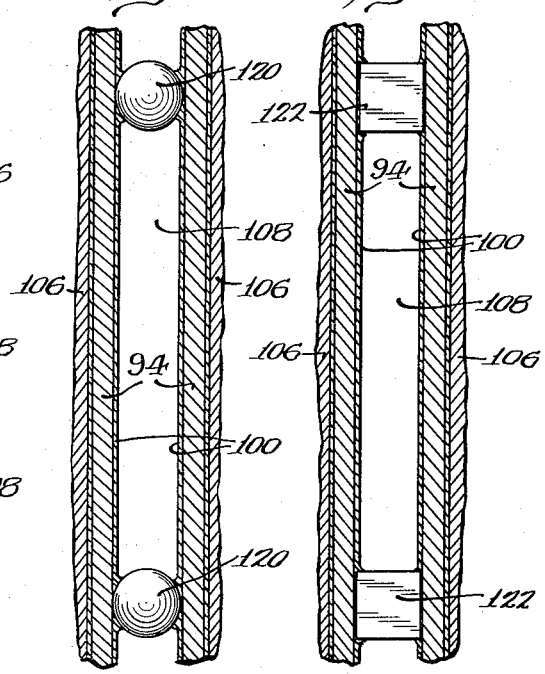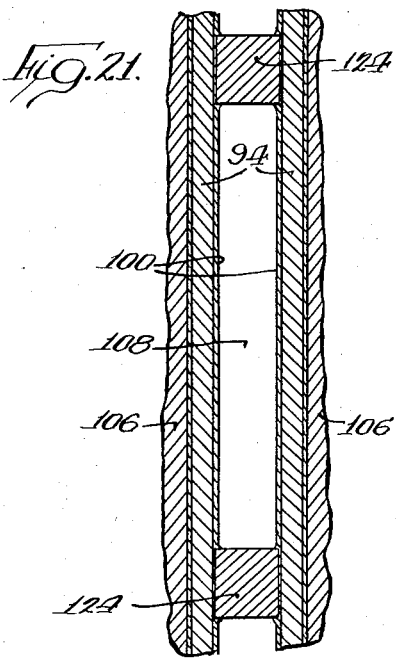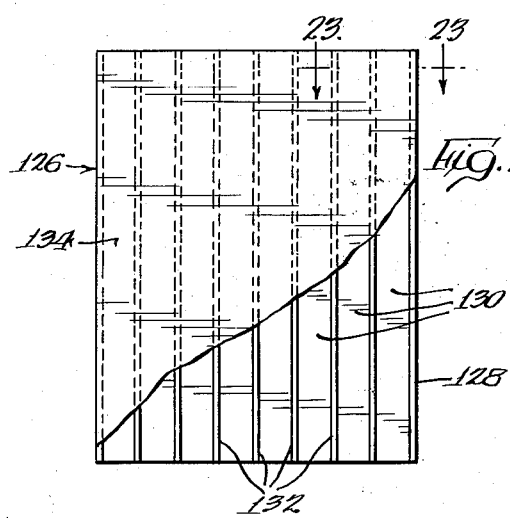

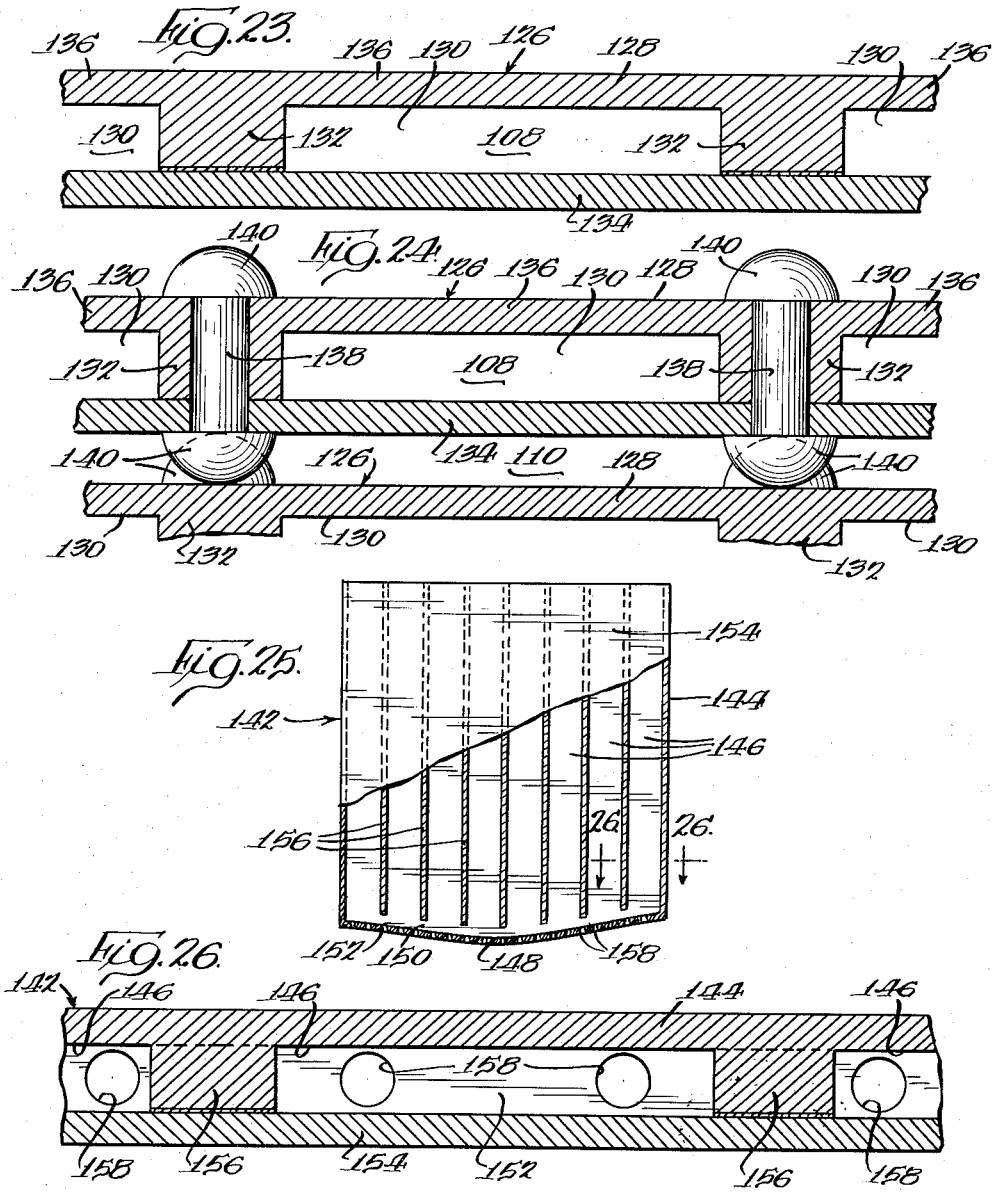

United States Patent Office 3,041,265
Patented June 26, 1962

3,041,265
ELECTRODE FOR ELECTROLYTIC HOLE SINKING
Lynn A. Williams, Winnetka, Ill., assignor to Anocut Engineering Company, Chicago, Ill., a corporation of Illinois
Filed Jan. 13, 1961, Ser. No. 82,645
24 Claims. (Cl. 204—234)

The present invention relates to electrodes for electrolytic hole sinking, and more particularly to an electrode of this type which is especially adapted for sinking cavities of relatively large transverse dimensions.

This application is a continuation-in-part of the copending application of Lynn A. Williams, Serial No. 800,276, filed March 18, 1959, entitled "Electrode for Electrolytic Hole Sinking," which has been abandoned.

One of the objects of this invention is to provide an improved electrode for electrolytic hole sinking which is equally effective regardless of the size or shape of the hole to be formed by the electrode.

An additional object is to provide an improved electrode of the above character which is particularly well adapted for supplying all portions of the surface being acted upon by the electrode with equally effective electrolyte.

Still another object is to provide a novel electrode which may be manufactured at relatively low cost, and which may be formed to any desired contour and to any desired size, and in which the length of the path of travel of the electrolyte over the working face is substantially uniformly short throughout the work area.

Yet another object is to provide a novel electrode which has passages for supplying electrolyte under pressure to a multiplicity of closely spaced slots or spots over the working face of the electrode, and which furthermore provides a multiplicity of escape paths for the electrolyte interspersed between the supply passages.

Other objects and advantages will become apparent from the following description of preferred embodiments of the invention which are illustrated in the accompanying drawings.

In the drawings, in which similar characters of reference refer to similar parts throughout the several views, FIG. 1 is a perspective view of a typical electrode embodying the features of the present invention;

FIG. 2 is a vertical sectional view which may be considered as taken in the direction of the arrows substantially along the line 2—2 of FIG. 1;

FIG. 3 is a vertical sectional view which may be considered as taken in the direction of the arrows substantially along the line 3—3 of FIGS. 2 and 5;

FIG. 4 is similar to FIG. 3, but is taken in the direction of the arrows substantially along the line 4—4 of FIGS. 2 and 5;

FIG. 5 is an enlarged fractional vertical sectional view taken in the direction of the arrows along the line 5—5 of FIG. 3;

FIG. 6 is an enlarged fractional horizontal sectional view taken in the direction of the arrows along the line 6—6 of FIG. 3;

FIG. 7 is a transverse sectional view drawn to large scale illustrating a group of some of the elements forming the electrode prior to assembly;

FIG. 8 is a view similar to FIG. 7, but showing a variation in the assembly technique;

FIG. 9 is a view of the parts illustrated in FIG. 7 after assembly;

FIG. 10 is an exploded perspective view of the principal electrode elements showing one arrangement for effecting their assembly;

FIG. 11 is a view similar to FIG. 10, but showing an alternative arrangement;

FIG. 12 is a vertical transverse sectional view through an electrode embodying features of the present invention, illustrating solutions to several problems of a somewhat special nature;

FIG. 13 is a fractional sectional view which may be considered as taken in the direction of the arrows substantially along the line 13—13 of FIG. 12;

FIG. 14 is a view generally similar to the lower portion of FIG. 2 showing the incorporation of a modification therein;

FIG. 15 is a fractional sectional view similar to FIG. 13 showing another modified form of electrode construction;

FIG. 16 is a fractional horizontal sectional view on an enlarged scale taken in the direction of the arrows along the line 16—16 of FIG. 15;

FIG. 17 is an exploded perspective view similar to FIGS. 10 and 11 showing an arrangement for effecting the assembly of the electrode of FIGS. 15 and 16;

FIGS. 18, 19, 20 and 21 are fractional horizontal sectional views on an enlarged scale, similar to FIG. 16, showing further modifications in the construction of the inlet or pressure units of the electrode of this invention;

FIG. 22 is an elevational view, partially broken away, of another modified form of pressure or inlet unit for the electrode of this invention;

FIG. 23 is a fractional horizontal sectional view on an enlarged scale taken in the direction of the arrows along the line 23—23 of FIG. 22;

FIG. 24 is a view similar to FIG. 23 showing still another modification of the electrode structure;

FIG. 25 is a view similar to FIG. 22 showing a further modification of the electrode unit;

FIG. 26 is a fractional horizontal sectional view on an enlarged scale taken in the direction of the arrows along the line 26—26 of FIG. 25; and FIG. 27 is a fractional sectional view similar to FIG. 26 showing a variation in the structure shown in FIGS. 25 and 26.

In the copending patent application of Lynn A. Williams, Serial No. 772,960, filed November 10, 1958, for "Electrolytic Shaping," there have been illustrated and described a process and apparatus with several variations for sinking cavities in metalloid workpieces by electrolytic action. In general, the arrangement there described consists in advancing an electrode toward and into the workpiece while electrolyte is supplied under pressure through the electrode so as to flow over the interface between the end of the electrode and the workpiece. A direct current source of low potential but high amperage capacity interconnects the electrode and the workpiece in a sense to make the electrode a cathode, as is diagrammatically indicated in FIG. 1, and the electrolytic action thus produced rapidly removes material from the workpiece in front of the advancing electrode.

As explained in that application, the electrolytic action, if it takes place at high current density (and this is desirable), results in rapid deterioration of the effectiveness of the electrolyte in the work gap. This is caused by ion depletion, gas formation, or both. The electrolytic action, thus, is reduced and may become irregular, unless the flow path of the electrolyte across the working interface can be kept dimensionally small. That patent application, therefore, contains several proposals for incorporation in large electrodes for introducing electrolyte to the working face at a plurality of spaced points, with escape paths for the electrolyte being provided between these points.

The electrode of the present invention is adapted for use with the apparatus of the above discussed type, and is highly advantageous in that it may be manufactured at relatively low cost, particularly since, in many of its forms, no drilling or slot milling is required, and it provides a multiplicity of supply passages for conveying electrolyte under high pressure to the working face of the electrode, with these supply passages being substantially equally spaced, and furthermore the arrangement is such that an electrolyte escape passage is provided closely adjacent each of the supply passages.

By referring first to FIGS. 1 to 9 of the drawings it will be seen that one form of the electrode of this invention is comprised essentially of a plurality of plates, some of which are flat, while others are corrugated.

In a typical embodiment, the flat plates 10 are about .011 inch thick. They have a length equal to the working length of the electrode plus an additional inch or so; the amount is not critical but will vary with electrode size, as will appear presently. The width of these plates is whatever is necessary to give the electrode the desired transverse dimension at the position of the particular plate. Conveniently they can be somewhat wider than necessary with final shaping of the electrode taking place after assembly.

The corrugated plates in the embodiment shown may also be made from stock about .011 inch thick which is corrugated—about sixteen corrugations to the inch—such that the overall thickness of the plates after corrugating is about .022 inch. There are about as many corrugated as flat plates, and about one half of the corrugated plates have the same dimensions as the flat plates, with the flutes of the corrugations extending away from the working face of the eventual electrode. These plates are indicated by the numeral 12. The remaining corrugated plates 14 are somewhat shorter, in a typical embodiment about ½″ to ¾″ shorter for instance. An additional element used in forming the electrode proper consists simply of a flat filler strip 16 which has a thickness about one or two thousandths of an inch less than the overall thickness of the corrugated plates. In the present example, therefore, its thickness is about .020 to .021 inch. Alternatively, the corrugated plate stock may be used for this purpose with the flutes extending longitudinally of the filler strips, as will appear. These strips 16 have a length equal to the width of the plates and a width which is appreciably less than the difference in length between the two sizes of corrugated plates 12 and 14. As shown, these filler strips 16 are about one quarter inch wide.

All of the elements described above may be manufactured from mild steel, or other suitable metal, such as stainless steel for instance. In the preferred procedure for making the electrode, the flat plates 10 are copper plated until the thickness of the copper film 18 thereon is approximately .0005 inch, or the steel may be copper clad by rolling. The electrode is then assembled by stacking the elements in the following order: a flat plate 10, a long corrugated plate 12, a flat plate 10, a short corrugated plate 14, a flat plate 10, a long corrugated plate 12, and so on until the stack has been built up to a size somewhat greater than that desired for the finished electrode. The plates are then brought into register with the ends of the short corrugated plates flush with the other plates at the end of the electrode which is to form the working face thereof. The stack is then lightly clamped so as to hold all of the elements in position. At this juncture it will be noted that there are a plurality of transversely extending slots across the end of the electrode opposite the working end, these slots being bounded by two of the flat plates and the top of the shorter corrugated plates 14.

One of the filler strips 16 is inserted into each of these slots with its top edge flush with the end of the stack. This is readily accomplished, since these filler strips are slightly thinner than the corrugated plates, and it is easy, therefore, to invert the stack with the top end against a flat plate, under which condition all of the filler strips will fall down against the plate or, if they stick slightly, they may be easily pushed down into this position.

The entire stack is then additionally compressed between flat parallel plates so as to clamp the filler strips and flatten the corrugations by a matter of one to two thousandths of an inch or so, thereby bringing the corrugations into intimate contact with the copper plated flat plates 10. The compressed stack is then inserted into a hydrogen brazing oven or the equivalent, and heated sufficiently to cause the copper to flow and braze the entire stack into a solid unitary structure.

After cooling, the top end of the stack is inserted into an opening in a box-like housing or manifold 18 which has an interior space or plenum chamber 20 in communication with the end of the stack. The assembly is then brazed around the line of juncture between the stack and housing to complete the assembly.

Liquid electrolyte is introduced under pressure, which may be as high as 300 p.s.i., to the plenum chamber 20 by way of a pipe 22 shown as being threaded through the top of the housing 18. From the plenum chamber 20 the electrolyte will flow downwardly along the flutes of the corrugations on each side of the long corrugated plates 12, as is best seen in FIGS. 5 and 6 for instance. None of the electrolyte under pressure, however, can enter the grooves on the sides of the short corrugated plates 14, since access to the ends of these grooves is blocked by the filler strips 16. On the other hand, these grooves on the faces of the short corrugated strips are open at their top ends to transversely extending slots 24 which are bounded by the top edges of the short corrugated plates, the bottom edges of the filler strip 16 and the two flat plates 10 against the faces of the short corrugated plates. These transverse channels are open at their ends at the two sides of the electrode, and thus liquid flowing upwardly through the grooves on each face of the short plates 14 will pass into the associated transverse passage 24 and issue freely from the ends thereof.

As a variation, instead of copper-plating the flat plates 10, as indicated at 18, prior to assembly, the stack may be assembled with the plates interleaved with one-half thousandth copper foil 26, as indicated in FIG. 8. When such a stack is compressed and heated in the brazing furnace, the entire stack is secured together into a single rigid unit in much the same manner as is accomplished when the plated plates are used.

In FIGS. 1 and 2, the electrode is shown as being substantially cylindrical. Such configuration, or in fact any other, can be provided by taking a rectangular stack of the elements as previously described, and machining or grinding or electrolytically shaping this stack to the desired final electrode contour so that the working portion of the electrode, indicated generally at 28, is surmounted by a shoulder or annular face 30. This face is characterized by the fact that its surface is made up of the ends of the plates in the stack, and therefore it will have a porous appearance much the same as will be found at the lower working end 32 of the electrode. To prevent electrolyte from issuing from this face in the same manner that it issues from the working end 32, the entire face 30 surrounding the working portion 28 of the electrode is coated with solder or some other material which plugs the ends of the grooves along the faces of the fluted plates. In doing this it is well to be careful that the solder is allowed to flow into the small reentrant openings formed where some of the grooves are intersected when the electrode is shaped. By so doing, leakage can be substantially eliminated along the line where the electrode proper 28 joins the upper rectangular portion thereof, and also along the side of the electrode, thereby eliminating uncontrolled sideward cutting action which might otherwise take place during use of the electrode.

The electrode of this invention provides a multiplicity of closely spaced isolated tubes or passages for supplying electrolyte to the working face, with a multiplicity of evenly interspersed tubes or passages for the free escape of electrolyte. Over the entire working face of the electrode, the distance between any supply passage and an adjacent escape passage is small and has a maximum which is equal to the thickness of one of the corrugated plates plus the thickness of one of the flat plates. Furthermore, it is apparent that the relationship discussed above holds true regardless of the size or shape of the electrode and that even for very large electrodes the pressure drop throughout is substantially constant, so that one portion of the electrode does not rob electrolyte from another portion.

The electrode of this invention also resists the bursting pressure of the electrolyte since the corrugated plates 12 are adequately bonded to the flat plates 10 on the inlet or pressure side of the electrode. The resistance to bursting or deforming the electrode is clearly sufficient to resist pressure in the range of use from 30 to 300 p.s.i.

Assembly of an electrode according to the technique described above is likely to be involved with difficulties in practice and particularly so with electrodes of large size. That procedure has been given more for the purpose of orientation than as the best solution to the problem. The trouble which arises is that in practice it is rather expensive to provide a fixture which will clamp the assembled stack between parallel flat plates at the time of brazing. A simpler approach to the problem which is satisfactory even with very large electrodes is illustrated in FIGS. 10 and 11.

In FIG. 10 it will be noted that the flat plates 40 are both longer and wider than the large size corrugated plates 42, and that the small size corrugated plates 44 have the same width as the large corrugated plates 42 but are considerably shorter. Also in this arrangement, the transversely extending spacer strips 46 are formed from the same corrugated stock as the corrugated plates, but with the corrugations running at right angles to those of the other corrugated plates in the final assembly. In building the stack from these elements, each of the long corrugated plates, or the short corrugated plates plus the spacer strips as the case may be, are surrounded by flat strips 48 which are slightly thinner than the corrugated plates. This assembly can be placed in a hydrogen brazing furnace with a stiff, flat plate on top of the stack and with sufficient weight or pressure upon the stiff plate to compress all of the corrugated members until the flat plates 40 bottom against the surrounding strips 48.

This weighted assembly, after brazing and cooling, is subjected to a sawing operation, with the saw cuts extending approximately along the lines 50 so that the resulting electrode element will be the same as the one previously discussed except that the transverse spacer strips 46 are corrugated rather than flat, as are those indicated at 16. The use of corrugated transverse strips has the advantage that they offer substantially the same resistance to compression as the corrugated plates in the stack, and therefore do not have any tendency to warp the stack when it is compressed. Since the flutes of the corrugated spacer strips 46 extend transversely of the electrode, these strips of course effectively block the flow of electrolyte in the same manner as do the flat strips 16.

An alternative to this arrangement is illustrated in FIG. 11 in which the assembly is the same as that in FIG. 10 except that no separate transverse spacer strips 46 are used. In their stead, the top flat strips 48a, which are above the ends of the short corrugated plates 44, have a width equal to that of the narrower flat strips 48 used at the top of the assembly at the ends of the long corrugated plates, plus a width approximately equal to that of the transverse spacer strips 46. After this assembly has been brazed, the saw cut across the top of the stack which removes the top strips 48 will also remove an equivalent amount of the top strips 48a, so that at the completion of this and the other sawing operations conducted along the side and bottom edges, the assembly will be the same as that of the first described embodiment.

In electrolytic shaping certain ordinarily difficult problems arise in certain applications that are easily dealt with by using the teachings of this invention. Some of these problems and representative expedients for dealing with them are illustrated in FIG. 12. The electrode there shown may be considered as essentially similar to those previously described except that it has a relatively shallow draft angle of about five to seven degrees upon the left hand side, and an extensively compoundly curved working end providing reentrant portions. Additionally, it may be considered that this electrode is of quite large size, such as might be used for sinking a die cavity. For instance, it may be assumed that the electrode transverse dimensions at its working end are of the order of two or three feet or more.

Probably the easiest and best manner of shaping an electrode of any comparatively elaborate contour, such as the one shown for instance, is to provide an electrically conductive master 60 having a cavity 62 therein which is substantially a duplicate of the cavity it is desired to form in the eventual workpiece. Frequently a finished workpiece will itself serve this purpose. The polarity of the electrical supply is then reversed so that the master 60 becomes the cathode and the rough electrode 70 the anode. This is indicated diagrammatically by the reversing switch 64 being shown in a position such that it connects the electrode to the positive side of the electrical supply 65 and the master 60 to the negative side thereof. With the electrical connections thus made, and electrolyte flowing through the inlet opening 66 into the plenum chamber 68 and thence downwardly through the passages in the electrode, the electrode is advanced against the master, and this advance is continued as metal is removed electrolytically from the electrode, until the electrode has conformed to the shape of the cavity 62. Thereafter the electrode is withdrawn, and the reversing switch thrown in the opposite direction so as to connect the electrode as a cathode.

Because of the multiplicity of closely spaced electrolyte supply passages throughout the electrode, the side at 72 having a taper from the vertical of only a few degrees, exposes the ends of many of these electrolyte supply passages along this tapered face and insures the adequate supply of electrolyte at this tapered surface and good electrolytic contouring therefore is insured. Because the ends of some of these electrolyte supply passages are exposed above the surface of the workpiece during at least the initial phases of the formation of the eventual cavity, nozzles 74 are provided and supply one or more downwardly directed air blasts against the side of the electrode for the removal of this excessive amount of electrolyte.

The reentrant cavity 76 at the end of the electrode might in an ordinary electrode be a source of trouble, since gas might collect there and displace electrolyte with a consequent reduction in electrolytic action, but with the electrode of the present invention no difficulty is occasioned, because the closely spaced electrolyte escape passages throughout the structure provide an exit for the gas as well as the electrolyte.

Due to the low voltage it is preferred to use in this forming process, the voltage drop across a large electrode is a significant factor, since it may result in the voltage being appreciably less at the center of the electrode if the electrical connections are made at the side. This problem is easily overcome in the present electrode as follows. All of the flat plate members are provided with short upwardly extending tabs 78. As shown, these tabs are at the centers of the flat plates, but there can be more than one tab for each plate with very large electrodes. These tabs 78 are all brazed or soldered to a transversely extending bus bar 80 which at its ends may be secured directly to the top housing 82 as by the screws 84, for instance. This bus bar acts as a low resistance path to equalize the voltage as between the edges and center of the electrode and since it is spaced above the plates by the length of the tabs 78 the electrolyte can flow freely from the sides into the electrolyte passages which have their upper ends beneath the bus bar.

In some instances it may be desirable to hold the lateral cutting action of a straight sided electrode of the type of FIGS. 1 and 2 to a minimum. This may be accomplished as shown in FIG. 14 by surrounding the lower end of the electrode with a narrow metal band 86 which extends the lateral dimension of the electrode somewhat. Above this band the side wall of the electrode is coated with an insulating substance 87, such as a ceramic enamel or an epoxy resin for instance, which gives the major portion of the electrode a transverse dimension slightly less than at the band 86. With an electrode of this type, the cutting action is limited principally to the conductive surface at the end and at the band 86, since the electrical current path above the band is appreciably longer and thus the voltage drop is greater. The hole formed by the electrode therefore is not much larger than the external size of the band 86.

The electrodes described above leave the bottom surface of a cavity formed in a workpiece with a pattern reflecting the porous nature of the end of the electrode. This situation can be improved if desired by using thinner and more finely corrugated plates and flat plates of similar thickness than those discussed above. For instance, metal foil only a thousandth of an inch thick may be used for the manufacture of these plates. This pattern effect can also be largely eliminated by interrupting the advance of the electrode when the cavity is a few thousandths of an inch short of the final desired cavity depth. Although movement of the electrode ceases, the electrolyzing current is allowed to remain on for ten seconds or so, so that the cavity continues to deepen, thus producing an enlarged electrode to workpiece gap by a matter of .005 to .006 inch or so. Under these conditions the small projections which form the pattern effect at the bottom of the cavity are very largely removed, and a quite smooth, even surface is produced.

It was previously mentioned herein that there was some initial difficulty, later overcome, in assembling electrodes of the construction shown in FIGS. 1 to 9. It has also been found that unless the electrodes are carefully made the bonding or brazing metal may flow sufficiently to obstruct or plug one or more of the electrolyte inlet or pressure side passages defined by the flat and corrugated plates 10 and 12. Such obstructed passages may not always be detected by visual inspection of the electrode, and when the electrode is put into use the plugged passage or passages locally starve the working face of the electrode of electrolyte. This electrolyte starvation locally reduces the electrolytic action and erosion of the workpiece, and consequently there will be arcing or shorting between the electrode and the workpiece with damage to both. This is obviously and economically undesirable. To make a full and proper inspection of the electrode and to drill out the obstructed and plugged passages is, of course, possible, but it adds appreciably to the cost of electrode manufacture.

There is illustrated in FIGS. 15 to 17 a modified form of electrode 90 constructed of a number of electrode elements or units 92. Each element or unit is so constructed as to define the electrolyte inlet or pressure side passage or passages between a pair of flat plates 94 and a bonding and spacing plate 96 confined therebetween. The plates 94 and 96 may be .011 inch thick. The central plate 96 is formed with a pattern of spacing projections 98 formed on both sides thereof and standing out from the respective surfaces of the plate 96 a distance of about .010 to .011 inch. It is essential for proper electrode construction that the projections be accurately and uniformly formed, and success has been obtained with projections 1/32 inch in diameter arranged in a pattern where they are spaced apart 1/4 inch.

The plates 94 and 96 may be made of mild steel and the units of three plates may be bonded together by copper plated or copper foil bonding material. Or the plates 94 and 96 may be made of copper, in which case the flat plates 94 may be plated with a layer 100 of silver to a thickness of .3 to .5 mil. A suitable commercial silver brazing compound is sold under the trademark "Sil-Sol." The plates 94 and 96 are arranged as shown in FIG. 17 and are brought together. They are placed in a brazing oven, placed under pressure so as to contact the projections 98 against the plates 94, and subjected to a brazing temperature about 100° F. below the melting point of the silver, in a hydrogen atmosphere. The unit 92 is cooled, inspected and if found to be unobstructed is available to be assembled into the electrode 90.

It will be observed from FIG. 16 that the bonding silver forms small fillets 102 with the projections 98 thus increasing the holding power of the spacing and bonding means and their resistance to the bursting force of the entering electrolyte under a pressure which may be as high as 300 p.s.i.

The electrode elements or units 92 are assembled into the electrode 90 by stacking the requisite number together with their ends which define the electrode working face 104 aligned. At their ends opposite the working face the elements or units 92 are spaced apart by blocking filler strips 106. The strips 106 are about .030 inch thick and are as wide as the plates 94 and 96 but are very appreciably shorter being no longer than one inch for an electrode that is 3 or 4 inches long. The strips 106 may be bonded to the adjacent flat plates 94 of the elements or units 92 by silver solder or an epoxy cement. The spacing and filler strips 106 hold the elements or units 92 in spaced apart parallel position to define exit passages as will appear hereinafter.

The electrode 92 thus assembled is inserted into the header or manifold 18 having the plenum chamber 20. Inlet passages 108 communicate with the plenum chamber 20 to receive electrolyte under pressure which flows down the passages 108 to the working face 104 of the electrode and the interface between the electrode and the workpiece. The used or spent electrolyte flows upwardly through outlet or exhaust passages 110 between the elements 92 but cannot enter the plenum chamber 20 because of the blocking filler strips 106. The electrolyte then exhausts sidewardly from the electrode.

To prevent undesired side electrolytic action the inlet and exhaust passages may be closed by a sheet 112 of suitable material, such as an epoxy resin. It is essential that this enclosure have suitable exhaust or outlet openings 114 therein immediately below the blocking strips 106.

The essential features of this form of electrode are the same as those previously discussed with respect to the form shown in FIGS. 1 to 9, namely, that there are alternate inlet and exhaust passages spaced close together at the working face across the ends of the conductive plates 94 and 96; that there are spacing and bonding elements 98 between the flat plates 96 on the pressure side of the electrode; and that there are spacing means 106 to separate the plates 96 on the exit side which also block the exit passages from the plenum chamber. It has not been found essential to support the units 92 on the exhaust or exit side except for the strips 106, since the units 92 over the usual size of a few inches are sufficiently rigid. However, in very large electrodes of two or three feet in width it might be advisable to use a few small spacing blocks inwardly from the edges of the electrode at places which would not obstruct the exhaust flow. Since the outlet electrolyte pressure is low only a few such blocks would be needed.

It should be appreciated that the structure of FIGS. 15 through 17 will leave little chance for obstruction in the path of electrolyte flow through the passages 108 due to the spaced positions of the projections 98 which may also be positioned at random. As a modified form of this construction the dimpled plate 96 may be replaced by a corrugated plate like the plate 12 and should any passage become irreparably obstructed the unit 92 may be discarded with little monetary loss.

FIGS. 18 through 21 show modifications of the electrode of FIGS. 15 to 17 with various arrangements for spacing the plates forming the inlet or pressure passages 108.

The unit of FIG. 18 is formed of a flat plate 94 and a deeply dimpled plate 116 having a pattern of projections 118 somewhat larger than the projections 98. The plates are bonded together by silver brazing material 100 into the inlet units which in turn are assembled into electrodes and are parallelly spaced by the strips 106 to define the exit passages.

In the electrode of FIG. 19 the flat plates 94 are separated by balls or beads 120 of nickel. These spacing beads or balls may be .030 inch in diameter and may be distributed in a random pattern by scattering them from a salt shaker or the like onto a heated plate which maintains the brazing medium 100 in molten condition. The plates 94 are pressed together to contact the spacing beads 120 and the unit is cooled. The thusly formed element is ready to be assembled into an electrode.

The electrode unit of FIG. 20 is similar to that of FIG. 19 except that in place of the spacing balls 120 the spacers and connectors are formed by blocks 122 of suitable material such as nickel or copper.

In FIG. 21 the plates 94 are shown as spaced apart and bonded together by strips or wires 124 which may extend to the working face of the electrode.

A further modification of electrode inlet unit 126 is shown in FIGS. 22 and 23 and includes a copper plate 128 which is extruded, rolled or milled to provide a plurality of parallel slots 130 bounded by parallel spacing ribs 132. The slots may be ¼ inch wide and the ribs 1/16 inch or slightly less in width. The depth of the slots may be .030 inch and the thickness of the unit about .060 inch or slightly more. The open sides of the slots 130 are closed by a cover plate 134 identical in size and shape to the slotted plate 128 and having a thickness equal to the web 136 of the slotted plate. The cover plate 134 is brazed to the exposed faces of the ribs 132, care being taken not to use excessive brazing material so as not to obstruct the inlet passages. It should be noted that the inlet passages 108 are centered with respect to the unit. A plurality of units 126 are formed into an electrode in the manner shown in FIGS. 15 and 17.

In some cases the slotted plate 128 may be fastened to the cover plate 134 by small rivets 138 passed through the spacing ribs 132. If the rivet heads 140 are formed with a tool so as to be of uniform height they can be used to space one electrode element or unit 126 from the next, thus maintaining a uniform spacing in the exit passage 110 all the way from the working face to the blocking strip 106 at the header or manifold. The strip 106 is not shown in FIG. 24, but occupies the position shown in FIG. 15.

In FIGS. 25 and 26 a modification of the electrode element or unit 126 is shown, and a unit 142 is formed of a copper plate 144 having milled slots 146 therein. The milling operation is stopped short of the working face 148, and with an end mill a transverse slot 150 is cut so as to leave tip 152 intact. The land or unmilled material of the tip is kept thin, not more than 1/16 inch. A cover plate 154 is brazed to ribs 156 between the slots 146 and to the tip 152 in the manner disclosed above. Numerous small holes 158 .030 inch in diameter and spaced about .100 inch apart are drilled in the tip 152 to communicate the interior of the element 142 with the working surface 148 of the tip 152.

The electrode unit of FIG. 27 is formed in the same manner as that of FIGS. 25 and 26 except that the tip 152 is slotted at 160 before the plate 154 is attached so that when the plates are brazed together the slots 160 form rectangular openings to function as the circular openings 158.

The advantage of the arrangements shown in FIGS. 25 to 27 over those having slotted openings is that the small holes give a smoother pattern in the work, with the result that to achieve a completely smooth surface it is necessary to remove a smaller amount of material than is the case with the electrode shown in FIGS. 22 and 23, for example. There is always a pattern in the work which reflects the openings in the total electrode, but where numerous small holes are used the pattern includes nubs of material which are raised slightly above the nominal or intended surface of the work. These nubs do not extend quite as high as the hills which are obtained when electrodes having slot type openings are used. The total amount of material contained in the nubs is small, so that in the polishing or finishing operation there is less mass of material to be removed to reach the desired surface than if hills had to be smoothed.

Although, in the interest of completeness of disclosure, certain dimensions have been given for the elements of the illustrated embodiments of the invention, it will be understood that these dimensions are not critical and may be varied as desired. It will be understood also that other changes may be made in the specific structures illustrated and described without departing from the spirit and scope of the invention, and that the scope of the invention is to be determined from the scope of the following claims.

What is claimed as new and useful and desired to be secured by Letters Patent of the United States is:

1. An electrode for the electrolytic removal of material from a workpiece in conjunction with a liquid electrolyte supplied through passages in the electrode intersecting the working face thereof, said electrode comprising a stack of corrugated plates oriented with the grooves in the faces thereof intersecting the working face of the electrode, a plurality of flat plates interleaved between said corrugated plates and forming with said corrugated plates a multiplicity of parallel passages, alternate corrugated plates being short in the groove direction with respect to the others of said corrugated plates, all of said plates being oriented to provide a relatively smooth end at the electrode working face, a filler element between each pair of flat plate faces which embrace a short corrugated plate, said filler elements being beyond the ends of said short corrugated plates by a distance sufficient to provide a transverse passage through the electrode for each of said filler elements, each of said transverse passages being intersected by the grooves in one of said short corrugated plates, said plates and filler elements being secured together to provide a unitary structure, means forming a plenum chamber communicating with the end of the stack opposite the end providing the working face, and said plenum chamber forming means leaving exposed at least one of the ends of each of said transverse passages, and means providing an electrical connection to said plates.

2. An electrode for the electrolytic removal of material from a workpiece in conjunction with a liquid electrolyte supplied through passages in the electrode intersecting the working face thereof, said electrode comprising a stack of corrugated plates oriented with the grooves in the faces thereof intersecting the working face of the electrode, a plurality of flat plates interleaved between said corrugated plates and forming with said corrugated plates a multiplicity of parallel passages, alternate corrugated plates being short in the groove direction with respect to the others of said corrugated plates, all of said plates being oriented to provide a relatively smooth end at the electrode working face, a filler element between each pair of flat plate faces which embrace a short corrugated plate, said filler elements being beyond the ends of said short corrugated plates by a distance sufficient to provide a transverse passage through the electrode for each of said filler elements, each of said transverse passages being intersected by the grooves in one of said short corrugated plates, said plates and filler elements being secured together to provide a unitary structure, means forming a plenum chamber communicating with the end of the stack opposite the end providing the working face, said plenum chamber forming means leaving exposed at least one of the ends of each of said transverse passages, the end of the electrode providing the working face and the adjacent side wall portion being smaller in transverse section than the remaining portion of the electrode and forming a shoulder portion at the juncture of the smaller portion with the remaining portion, and said shoulder portion being coated to seal off substantially all of the passages intersecting said shoulder portion, and means providing an electrical connection to said plates.

3. The electrode called for in claim 1 in which each of the elements thereof is brazed to its contiguous elements.

4. The electrode called for in claim 2 in which each of the elements thereof is brazed to its contiguous elements.

5. The electrode called for in claim 1 in which at least some of the flat plates in said stack have an integrally formed tab extending outwardly therefrom within said plenum chamber and in which a bus bar extends across and is electrically connected to said tabs to tend to equalize the electrical potential of the center of said stack with respect to the edges thereof.

6. The electrode called for in claim 2 in which at least some of the flat plates in said stack have an integrally formed tab extending outwardly therefrom within said plenum chamber and in which a bus bar extends across and is electrically connected to said tabs to tend to equalize the electrical potential of the center of said stack with respect to the edges thereof.

7. An electrode for the electrolytic removal of material from a workpiece in conjunction with a liquid supplied through passages in the electrode intersecting the working face thereof, said electrode comprising a stack of corrugated plates oriented with the grooves in the faces thereof intersecting the working face of the electrode, a plurality of flat plates interleaved between said corrugated plates and forming with said corrugated plates a multiplicity of parallel passages, alternate corrugated plates being short in the groove direction with respect to the others of said corrugated plates, all of said plates being oriented to provide a relatively smooth end at the electrode working face, a filler element between each pair of flat plate faces which embrace a short corrugated plate, said filler elements being beyond the ends of said short corrugated plates by a distance sufficient to provide a transverse passage through the electrode for each of said filler elements, each of said transverse passages being intersected by the grooves in one of said short corrugated plates, said plates and filler elements being secured together to provide a unitary structure, means forming a plenum chamber communicating with the end of the stack opposite the end providing the working face, said plenum chamber forming means leaving exposed at least one of the ends of each of said transverse passages, and means providing an electrical connection to said plates.

8. An electrode for electrolytic removal of material from a workpiece in conjunction with liquid supplied through passages in the electrode intersecting the working face thereof, comprising a stack of corrugated plates oriented with grooves in the faces thereof intersecting the working face of the electrode, each corrugated plate being bounded on both sides thereof with a flat plate to define with the corrugations liquid inlet passages, a filler element between each pair of adjacent flat plates at the ends of said plates remote from the working face of the electrode to space said plates apart a distance sufficient to define a transversely exiting outlet passage for the liquid in communication with the working face of the electrode, said flat and corrugated plates and said filler elements being secured together to provide a unitary structure, means forming a plenum chamber communicating with the ends of the passages defined by said flat and corrugated plates opposite the working face of the electrode, and means providing an electrical connection to said plates.

9. An electrode for the electrolytic removal of material from a workpiece in conjunction with liquid supplied through passages in the electrode intersecting the working face thereof, comprising a stack of spaced plates, spacing and bonding elements separating pairs of adjacent plates to define liquid inlet passages intersecting the working face of the electrode, a filler element between each pair of inlet passage forming plates at the ends of said plates remote from the working face of the electrode to space said pairs of plates apart a distance sufficient to define a transversely exiting outlet passage for the liquid in communication with the working face of the electrode, said plates, said spacing and bonding elements, and said filler elements being secured together to provide a unitary structure, means forming a plenum chamber communicating with the ends of the inlet passages opposite the working face of the electrode, and means providing an electrical connection to said plates.

10. The electrode called for in claim 9 in which said spacing and bonding elements comprise corrugated plates with the corrugations intersecting the working face of the electrode.

11. The electrode called for in claim 9 in which said spacing and bonding elements comprise reversely dimpled plates confined between the members of said pairs of adjacent plates.

12. The electrode called for in claim 9 in which said spacing and bonding elements comprise projections extending from at least one of the members of said pairs of adjacent plates toward the other member.

13. The electrode called for in claim 9 in which said spacing and bonding elements comprise randomly disposed, uniformly sized spacers.

14. The electrode called for in claim 9 in which said spacing and bonding elements comprise a plurality of very small, uniformly sized spherical spacers.

15. The electrode called for in claim 9 in which said spacing and bonding elements comprise a plurality of very small, uniformly sized blocks.

16. The electrode called for in claim 9 in which said spacing and bonding elements comprise a plurality of spacing strips extending between the plenum chamber and the working face of the electrode.

17. An electrode for the electrolytic removal of material from a workpiece in conjunction with liquid supplied through passages in the electrode intersecting the working face thereof, comprising a stack of spaced plates, alternate plates having relatively wide grooves bounded by narrow ribs of uniform height formed in one face thereof, the others of said plates being flat and secured to the ribs to define with said grooves liquid inlet passages intersecting the working face of the electrode, a filler element between each pair of inlet passage forming plates at the ends of said plates remote from the working face of the electrode to space said pairs of plates apart a distance sufficient to define a transversely exiting outlet passage for the liquid in communication with the working face of the electrode, said plates, and said filler elements being secured together to provide a unitary structure, means forming a plenum chamber communicating with the ends of the inlet passages opposite the working face of the electrode, and means providing an electrical connection to said plates.

18. The electrode called for in claim 17 in which the flat plates are brazed to the ribs of said grooved plates.

19. The electrode called for in claim 17 in which the flat plates are secured to the ribs of said grooved plates by headed rivets through said ribs and said plates, the rivet heads additionally spacing said pairs of plates in the outlet passages.

20. An electrode for the electrolytic removal of material from a workpiece in conjunction with liquid supplied through passages in the electrode exiting at the working face thereof, comprising a stack of spaced plates, alternate plates having relatively wide grooves bounded by narrow ribs of uniform height formed in one face thereof, said grooves extending from one end of said plates substantially to the other end, a transverse groove in each plate interconnecting said first grooves adjacent a narrow land extending across the end of said plate and having a height equal to that of said ribs, the others of said plates being flat and secured to the ribs and said lands to define with said grooves liquid inlet passages, closely spaced holes in said lands communicating said passages with the working face of the electrode, a filler element between each pair of inlet passage forming plates at the ends of said plates remote from the working face of the electrode to space said pairs of plates apart a distance sufficient to define a transversely exiting outlet passage for the liquid in communication with the working face of the electrode, said plates, and said filler elements being secured together to provide a unitary structure, means forming a plenum chamber communicating with the ends of the inlet passages opposite the working face of the electrode, and means providing an electrical connection to said plates.

21. The electrode called for in claim 20 in which said holes are circular with a diameter substantially equal to the height of the lands.

22. The electrode called for in claim 20 in which said holes are rectangular and extend the height of the lands.

23. A laminated electrode structure for introducing and exiting electrolyte from a working surface thereof comprising a group of metallic laminar sheets, first spacing and bonding means between said sheets in every other interspace between said sheets, said spacing and bonding means separating said sheets to provide inlet passages for electrolyte to flow toward the working surface thereof, and second spacing means between said sheets in the alternate spaces not occupied by said spacing and bonding means to provide exit passages for electrolyte from said working surface, a header means located opposite said working surface and fastened to said laminar sheets and arranged for introducing electrolyte into every other space between said sheets where said spacing and bonding means are located, and said second spacing means blocking entry of electrolyte from said header into the alternate spaces between said laminar sheets, said alternate spaces being open for at least a portion of their length on at least one side in a plane substantially normal to said working surface whereby electrolyte may exit from said alternate spaces.

24. A laminated electrode structure for introducing and exiting electrolyte from a working surface thereof comprising a group of metallic laminar sheets, first spacing and bonding means between said sheets in every other interspace between said sheets, said spacing and bonding means separating said sheets to provide inlet passages for electrolyte to flow toward the working surface thereof, and second spacing means between said sheets in the alternate spaces not occupied by said spacing and bonding means to provide exit passages for electrolyte from said working surface, a header means located opposite said working surface and fastened to said laminar sheets and arranged for introducing electrolyte into every other space between said sheets where said spacing and bonding means are located, and blocking means to prevent entry of electrolyte from said header into the alternate spaces between said laminar sheets, said alternate spaces being open for at least a portion of their length on at least one side in a plane substantially normal to said working surface whereby electrolyte may exit from said alternate spaces.

References Cited in the file of this patent

UNITED STATES PATENTS

| | | |
|---|---|---|
| 2,080,234 | Schlotter | May 11, 1937 |
| 2,878,560 | Gier | Mar. 24, 1959 |

FOREIGN PATENTS

| | | |
|---|---|---|
| 335,003 | Great Britain | Sept. 18, 1930 |
| 815,090 | Great Britain | June 17, 1959 |

Dedication 3,041,265.—*Lynn A. Williams*, Winnetka, Ill. ELECTRODE FOR ELECTROLYTIC HOLE SINKING. Patent dated June 26, 1962. Dedication filed Dec. 23, 1971, by the assignee, *Anocut Engineering Company*.

Hereby dedicates to the Public the portion of the term of the patent subsequent to Dec. 24, 1971.

[*Official Gazette March 14, 1972.*]